Feb. 24, 1931.  E. D. MOORE  1,793,557
CURRENT COLLECTION SCHEME
Filed Nov. 1, 1929
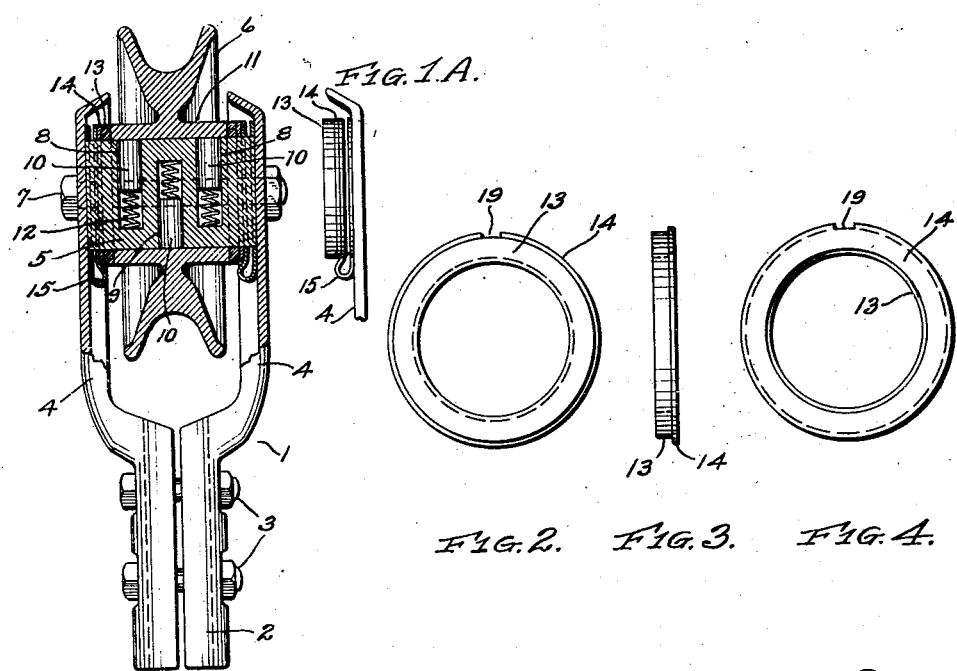
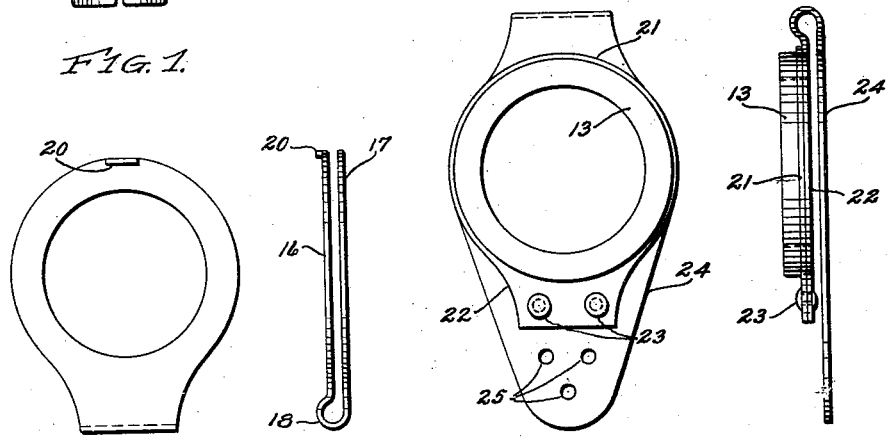
Inventor
EDGAR D. MOORE
By
Attorney
Witness:
H. J. Stromberger Patented Feb. 24, 1931

1,793,557

UNITED STATES PATENT OFFICE

EDGAR D. MOORE, OF MANSFIELD, OHIO, ASSIGNOR TO THE OHIO BRASS COMPANY, OF MANSFIELD, OHIO, A CORPORATION OF NEW JERSEY

CURRENT-COLLECTION SCHEME

Application filed November 1, 1929. Serial No. 404,029.

My invention relates to current collecting devices and particularly to the conducting means between the wheel or shoe and the support therefor.

It is quite desirable to avoid wear upon the trolley wheel as much as possible and also to improve the conducting means between the wheel and harp due to the fact that the currents which the device must handle with present day equipment are very much greater than in the past. More attention is being given to the small details of construction to meet the present day requirements than has been the custom in the past.

Wheels and harps have been made with graphite bushings for many years or with graphite lubricating plugs, also with oil or grease type lubrication and while these forms of lubrication in themselves are quite efficient, they do not tend to improve the conductivity between the wheel and axle and more or less sparking takes place, which means pitting or roughening of the bearing surfaces and this in turn means rapid wearing out of the wheel hub and axle and a noisy, inefficient device.

To increase the conductivity between the wheel and harp, metal contact springs and other means have been applied to these parts of the hub and to the harp but these have not been efficient in that they as a rule have been made of copper or phosphor bronze which meant a metal to metal contact with welded movement therebetween and hence rapid wear of one of the parts.

In order to improve the present day collector, I have modified in particular the electrical conductivity between the hub and harp so as to increase the efficiency of such contact and to improve the device as a whole.

I have found that graphite is an excellent lubricating material and at the same time is a conductor to a degree while oil is an insulator, but graphite alone is not as good a conductor as is desirable, therefore I have found that by properly mixing graphite with metals and forming such mixtures to shape and using it as the element in contact with the moving wheel or shoe that I have not only provided at this point lubrication of a high degree, but also a conductor to a high degree not, however, equal in conductivity to that of pure metal.

My invention resides in the new and novel construction, combination and relation of the various parts hereinafter described and shown in the accompanying drawing.

In the drawing:—

Fig. 1 is a plane view in partial section of my invention.

Fig. 1 A is a partial plane view of one side of my invention.

Figs. 2, 3 and 4 are front, edge and back views respectively of the current collecting device which I use at the ends of the moving hubs.

Figs. 5 and 6 are side and edge views respectively of the spring element.

Figs. 7 and 8 show front and edge views of a combined collecting mechanism and spring.

In the construction shown in Fig. 1, I employ a harp 1 having a socket portion 2 for attachment to a trolley pole by means of the bolts and nuts 3. I have shown the harp as split, but this is not necessary in all cases as the arms 4 may be so constructed that the various parts may be assembled when the harp is made in one piece.

Positioned between the arms 4 is an axle 5 which I prefer to make of relatively large diameter so as to give as large a bearing surface in contact with the wheel 6 as possible to decrease the friction per unit area and to increase the total conductivity for current between the wheel and axle. The end faces of the axle 5 and the inner faces of the arms 4 are preferably machined to give a better and more efficient contact between the harp and axle and the axle is held in postion between the arms by a pair of spaced bolts 7 positioned on opposite sides of the vertical diameter of the axle 5.

Positioned within the transverse plane coinciding with the vertical diameter of the axle are three pockets 8—8 and 9 and in each pocket is a plug of graphite 10 pressed outwardly and in contact with the wheel hub 11 by means of the spring 12. The plugs may be positioned in other planes.

The plugs 10 are preferably made by extruding a mixture of graphite and a small amount of binder such as varnish, paraffine, etc., and then cut to required lengths. These plugs gradually wear away and the particles of graphite are distributed between the bearing surfaces of the axle 5 and the hub 11 producing highly lubricated glazed surfaces upon these parts which resist wear and without decreasing the conductivity greatly.

In order to utilize the end faces of the hub 11 to conduct current, I employ in contact with the said end faces a ring element 13 composed of comminuted particles of metal and graphite mixed and pressed to shape. In producing the anti-friction element 13 I may employ a mixture of very finely divided copper and graphite varying the proportions as desired but with the copper preferably in excess of the graphite and then compressing this mixture in a mold to give it desired shape of the element and then heating the pressed mixture in a closed container to about 1500° F. for about fifteen to thirty minutes. This tends to unite the particles and binds them together, producing an element which has higher conductivity than graphite alone and much better lubrication properties than copper alone. A small amount of binder, such as bitumen, may be used if desired. This material is somewhat porous, therefore I find it advantageous to fill these pores with oil or melted paraffine which enhances the lubricating properties without effecting the conducting properties. If desired there may be added to the mixture tin, zinc, lead, etc., in finely divided condition. It is well to keep air away from the mixture as much as possible, especially while heating to prevent oxidization.

The anti-friction element just described is, of course, somewhat fragile and will not stand as much rough usage as it is often subjected to and therefore I find it particularly desirable to back one face of the element with a ring 14 stamped of sheet copper. This may be done by tinning the face of the element 13 and then soldering the element 14 thereto, or this face may be given a coating of copper as by electrical deposition and the ring 14 secured to this coating by the ordinary soldering process. It will be quite evident that the ring 14 will stiffen materially the ring 13 and prevent its being easily broken and also if it should become cracked, the parts will still retain their relative relation and without rendering the element unusable. The combined elements 13 and 14 are placed in position upon the axle 5 with the free face of the anti-friction element 13 in contact with the end face of the hub 11. In order to place the parts 13 and 14 in electrical contact with the arms 4, I interpose a spring element 15 which is formed from hard drawn copper or phosphor bronze sheet and comprising two substantially parallel ring portions 16 and 17 connected by a bight 18. One face of this spring contacts with the ring 14 and the other face contacts with the arm 4 thus placing the end faces of the hub 11 in electrical contact with the arms 4 and also allowing the wheel 6 to move transversely on the axle 5 due to side stresses when in operation and increasing thereby materially the life of the wheel.

I find it desirable to lock the elements 13—14 and the spring 15 against relative rotation. While this may be done in various ways I have shown the ring 14 providing a notch 19 and the spring 15 with small projecting lug 20 which interlocks with the notch 19.

It may be desired to combine the elements 13—14 and the spring 15 into a unitary device which may be riveted to the arms 4. Since heat is applied to the ring 14 in order to solder it to the ring 13, such heat is liable to draw the temper of the metal, therefore I find it better to make the ring 14 and the spring 15 or its equivalent of separate pieces and in Figs. 7 and 8 I have shown the ring 13 as secured to a ring 21 having a lip portion 22. Secured to the ring portion 22 by means of rivets 23 is a spring element 24 provided with holes 25 to receive rivets for fastening the spring 24 to the arms 4, and it may be preferable in some cases where the current to be collected is abnormally large but as a rule the construction shown in Figs. 2 to 6 inclusive will be found sufficient.

Modifications will suggest themselves to those skilled in the art and therefore I wish to be limited only by my claims.

I claim:—

1. A current collector comprising a harp with spaced arms and means to secure it to a support, an axle mounted between the arms and having contact end faces engaging inner faces on the arms and means to detachably hold the axle in position, a recess in the axle and a spring held graphite plug mounted therein, a current collecting device rotatably mounted upon the axle and engaged by the graphite plug and having a hub with end faces spaced from the arms and current conducting means positioned between the said end faces on the hub and arms, each comprising metallized graphite rings contacting with the end faces of the hub, metal rings fixedly secured to one face of the metallized rings, springs each having two ring portions encircling the axle each connected by a bight and positioned between the metal ring and the arm and yieldably holding the metallized graphite ring in contact with the hub face and conducting current therefrom to the arm and means to interlock the spring and metal ring against relative rotation.

2. A current collector comprising a harp with spaced arms and means to secure it to a support, an axle mounted between the arms and having contact end faces engaging inner faces on the arms and means to detachably hold the axle in position, a recess in the axle and a spring held graphite plug mounted therein, a current collecting device rotatably mounted upon the axle and engaged by the graphite plug and having a hub with end faces spaced from the arms and current conducting means positioned between the said end faces on the hub and arms each comprising metallized graphite rings contacting with the end faces of the hub, metal rings fixedly secured to one face of the metallized rings, springs each having two ring portions encircling the axle each connected by a bight and positioned between the metal ring and the arm and yieldably holding the metallized graphite ring in contact with the hub face and conducting current therefrom to the arm.

3. A current collector comprising a harp with spaced arms, an axle mounted between the arms and having contact end faces engaging with faces on the arms and means to detachably hold the axle in position, a recess in the axle, a current collecting device rotatably mounted upon the axle and having a hub with end faces spaced from the arms, a graphite plug in the recess and a spring urging the plug into contact with the hub, current conducting means positioned between the said end faces on the hub and the arms each comprising metallized graphite rings contacting with the end faces of the hub, metal members fixedly secured to one face of the metallized graphite rings and U shaped springs each having two ring portions encircling the axle and connected by a bight and positioned between the metal ring and adjacent arm and yieldingly holding the metallized graphite ring in contact with the hub face and engaging the adjacent arm.

4. A current collector comprising a harp with spaced arms, an axle mounted between the arms and having contact end faces engaging faces on the arms, a current collecting device mounted upon the axle and having a hub with end faces spaced from the arms, current conducting means positioned between the said end faces on the hub and the arms each comprising metallized graphite rings contacting with the end faces of the hub, metal members fixedly secured to one face of the metallized graphite rings and U shaped springs each having two ring portions encircling the axle and connected by a bight and positioned between the metal ring and adjacent arm and yieldingly holding the metallized graphite ring in contact with the hub face and engaging the adjacent arm.

5. A current collector comprising a harp, an axle mounted thereon, a current collector mounted on the axle and having a hub portion, current conducting means mounted between each end of the hub and the adjacent face of the harp and each means comprising a ring of metallized graphite encircling the axle and contacting with the hub and having a metal washer secured thereto to protect the graphite ring against breakage and a U shaped spring encircling the axle and pressing against the adjacent harp portion and the metal washer and an interlock between the washer and spring to prevent relative rotation.

6. A current collector comprising a harp, an axle mounted thereon, a current collector mounted on the axle and having a hub portion, current conducting means mounted between each end of the hub and the adjacent face of the harp and each means comprising a ring of metallized graphite contacting with the hub and having a metal washer associated to protect the graphite ring against breakage and a U shaped spring encircling the axle and pressing against the adjacent harp portion and the metal washer and an interlock between the washer and spring to prevent relative rotation.

7. A current collector comprising a harp, an axle mounted thereon, a current collector mounted on the axle and having a hub portion, current conducting means positioned between each hub end and the adjacent face of the harp and each means comprising a ring of metallized graphite encircling the axle and contacting with the hub and having a metal washer secured thereto to protect the graphite ring against breakage and a spring positioned between the member and the adjacent portion of the harp.

8. A current collector comprising a harp, an axle mounted thereon, a current collector mounted on the axle and having a hub portion, current conducting means positioned between each hub end and the adjacent face of the harp and each means comprising a member of metallized graphite encircling the axle and contacting with the hub and a spring positioned between the graphite ring and the adjacent portion of the harp and secured to the graphite member and engaging the harp.

9. A current collector comprising a harp, an axle mounted thereon, a current collecting member mounted on the axle and having a hub portion, current conducting means positioned between each hub end and the adjacent harp portion and each means comprising a metallized graphite member contacting with the hub, a metal reinforcing member secured thereto and yielding conducting means between the reinforcing member and the adjacent harp portion.

10. A current collector comprising a harp, an axle mounted thereon, a current collecting member mounted on the axle and having a hub portion, a recess in the axle and a graphite plug therein and pressing against the hub surface, current conducting means positioned between each hub end and the adjacent harp portion and each means comprising a metallized graphite member contacting with the hub and yielding conducting means secured to the metallized graphite member and engaging the adjacent harp portion.

11. A current collector spring conducting device comprising a metallized graphite ring, a metal ring fixedly secured thereto and a U shaped spring member secured to the metal ring and having means to secure the spring to a harp.

12. A current collector spring conducting device comprising a metallized graphite member to engage a relatively movable current collecting member a metal reinforcing member secured to the graphite member and a U shaped spring member secured to the reinforcing member.

13. A current conductor comprising a metallized graphite member to engage a current collector and a metal reinforcing member secured to the graphite member.

14. A current collector spring conducting mechanism comprising a metallized graphite member to engage a current collector, a metal reinforcing member secured to the graphite member and a spring to hold the graphite member in engagement with the current collector.

15. A current conductor comprising a metallized graphite member to engage a current collector and a metal reinforcing member soldered to the graphite member.

16. A current collector comprising a harp, an axle mounted thereon, a current collector member mounted on the axle, current conducting means positioned between the harp and current collector member and comprising a metallized graphite member contacting with the current collector member and a lubricant differing in nature from that of graphite reposing in the pores of the metallized graphite.

17. A current collector comprising a harp, having inner contact faces an axle mounted thereon between the contact faces, securing means extending through the harp and axle to secure the axle in place between the said faces, a current collector member mounted on the axle, current conducting means positioned between the harp and current collector member and comprising a metallized graphite member contacting with the current collector member and having a layer of metal intimately attached to one face and electrically connected to the harp.

In testimony whereof I affix my signature.

EDGAR D. MOORE.